(12) United States Patent
Lindberg et al.

(10) Patent No.: US 9,635,023 B2
(45) Date of Patent: *Apr. 25, 2017

(54) SECURE DIGITAL COMMUNICATIONS

(71) Applicant: DTS STEERING GROUP AB, Malmo (SE)

(72) Inventors: Niclas Lindberg, Ahus (SE); Anders Orre, Glumslöv (SE); Ilio Virgili, Veberöd (SE)

(73) Assignee: DTS STEERING GROUP AB, Malmo (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,094

(22) Filed: Jun. 8, 2015

(65) Prior Publication Data
US 2015/0271174 A1    Sep. 24, 2015

Related U.S. Application Data

(63) Continuation of application No. 14/202,533, filed on Mar. 10, 2014, now Pat. No. 9,083,754, which is a
(Continued)

(51) Int. Cl.
*H04L 9/32* (2006.01)
*H04L 29/06* (2006.01)
(Continued)

(52) U.S. Cl.
CPC .......... *H04L 63/0853* (2013.01); *G06F 21/57* (2013.01); *G06Q 20/02* (2013.01);
(Continued)

(58) Field of Classification Search
CPC ............. G06F 21/31; G06F 2221/2115; H04L 9/3226; H04L 9/0822; H04L 9/321
(Continued)

(56) References Cited

U.S. PATENT DOCUMENTS

2002/0016777 A1   2/2002   Seamons et al.
2010/0077454 A1   3/2010   Xiao et al.
(Continued)

FOREIGN PATENT DOCUMENTS

EP   0969430 A1   1/2000
EP   2128781 A1   12/2009
(Continued)

OTHER PUBLICATIONS

International Search Report mailed Jun. 26, 2012; PCT/SE2011/051085.
(Continued)

*Primary Examiner* — Mohammed Waliullah
(74) *Attorney, Agent, or Firm* — Ladas & Parry LLP

(57) ABSTRACT

The present disclosure relates to an improved method for digital communication and, in particular, an improved method for digital communication in terms of improved authentication and traceability. More specifically, the present disclosure relates to a method of performing a transaction between a first device and a second device wherein the first device having an established trusted communication relation with a first trusted device and the second device having an established trusted communication relation with a second trusted device, the first and the second trusted device each having an established trusted communication relation with a fourth trusted device, the first and the second device being aware of a policy for the transaction specifying a role definition for the first and the second devices.

19 Claims, 2 Drawing Sheets

Related U.S. Application Data continuation of application No. PCT/SE2011/051085, filed on Sep. 8, 2011.

(51) Int. Cl.
*G06Q 20/02* (2012.01)
*G06Q 20/10* (2012.01)
*G06F 21/57* (2013.01)

(52) U.S. Cl.
CPC ............ *G06Q 20/10* (2013.01); *H04L 9/3247* (2013.01); *H04L 63/0428* (2013.01); *H04L 63/0869* (2013.01); *H04L 63/126* (2013.01); *H04L 63/20* (2013.01); *G06F 2221/032* (2013.01)

(58) Field of Classification Search
USPC ......................................................... 713/178
See application file for complete search history.

(56) References Cited

U.S. PATENT DOCUMENTS

| | | | | |
|---|---|---|---|---|
| 2010/0153595 | A1* | 6/2010 | Sakuda ................. | G06F 13/385 710/63 |
| 2011/0289320 | A1* | 11/2011 | Twitchell, Jr. .......... | H04L 63/12 713/176 |
| 2011/0306363 | A1* | 12/2011 | Wang .................... | H04W 24/02 455/456.1 |
| 2012/0278397 | A1* | 11/2012 | Lindsay ................ | G06F 9/4843 709/206 |

FOREIGN PATENT DOCUMENTS

| | | | | |
|---|---|---|---|---|
| SE | EP 2128781 | A1 * | 12/2009 | ............. G06F 21/33 |
| SG | WO 2010033081 | A2 * | 3/2010 | ............. G06Q 20/02 |
| WO | 2007/068098 | A1 | 6/2007 | |
| WO | 2010/033081 | A2 | 3/2010 | |
| WO | 2011/081589 | A1 | 7/2011 | |
| WO | 2013/036180 | A1 | 3/2013 | |

OTHER PUBLICATIONS

International Preliminary Report on Patentability dated Jul. 18, 2013; PCT/SE2011/051085.

USPTO NFOA dated Aug. 21, 2014 in connection with U.S. Appl. No. 14/202,533.

USPTO FOA dated Dec. 15, 2014 in connection with U.S. Appl. No. 14/202,533.

USPTO NOA mailed Mar. 30, 2015 in connection with U.S. Appl. No. 14/202,533.

USPTO Notice of Allowability dated May 15, 2015 in connection with U.S. Appl. No. 14/202,533.

Andrew D. Jun, et al; "A Security Framework for Open Service Mobility Using Trust Delegation", Published in: Intelligent Signal Processing and Communication Systems, 2004. ISPACS 2004. Proceedings of 2004 International Symposium on; Nov. 18-19, 2004; pp. 226-231.

* cited by examiner

SECURE DIGITAL COMMUNICATIONS

TECHNICAL FIELD

The present invention relates to methods for digital communications systems.

BACKGROUND

The Internet has revolutionized the way business is done and has changed consumer behavior in a very short space of time. However, electronic commerce will only be able to realize its full potential if a number of important conditions are met, one important condition being that the communication between digital systems is secure.

It is of importance that information does not fall into the wrong hands, such as in the hands of an unauthorized party, or is tampered with by a participating party or by a third unauthorized party. It is also of importance that communications devices can trust each other.

SUMMARY

In view of the above-mentioned, it would be desirable to achieve an improved method for digital communication and, in particular, an improved method for digital communication in terms of improved authentication and traceability.

According to one aspect illustrated herein, there is provided a method of performing a transaction between a first device and a second device, the first device having an established trusted communication relation with a first trusted device and the second device having an established trusted communication relation with a second trusted device, and the first and the second trusted device each having an established trusted communication relation with a fourth trusted device, the method comprising the steps of the first device sending, to the first trusted device, first input data, and the second device sending, to the second trusted device, second input data, the first trusted device confirming the originality of the first device and sending the first input data to the fourth trusted device, and the second trusted device confirming the originality of the second device and sending the second input data to the fourth trusted device, the fourth trusted device, upon receipt of the first and the second input data, sending to the first trusted device a first receipt message comprising the first and the second input data, and sending to the second trusted device a second receipt message comprising the first and the second input data, the first trusted device sending, to the first device, the first receipt message and the second trusted device sending, to the second device, the second receipt message.

According to other aspects illustrated herein, there is provided a method in a first trusted device of performing a transaction between first device and a second device, the first device having an established trusted communication relation with the first trusted device, the first trusted device having an established trusted communication relation with a fourth trusted device, the method comprising the steps of the first trusted device receiving, from the first device, first input data, the first trusted device confirming the originality of the first device and sending the first input data to the fourth trusted device, the first trusted device receiving, from the fourth trusted device, a first receipt message comprising the first input data and second input data received by the fourth device, the first trusted device sending, to the first device, the receipt message.

By using methods according to the present invention, many important advantages may be achieved, such as:

1. Digital identities may be allowed to evolve as real life identities.
2. Digital interactions are able to support the real life legal properties of a role with respect to Intellectual Property Rights (IPR).
3. Digital interactions may now be witnessed by a third party to support digital traceability.

The above described and other features are exemplified by the following figures and detailed description.

BRIEF DESCRIPTION OF THE DRAWINGS

Embodiments of the present invention will now be described in more detail, reference being made to the enclosed drawings, in which.

DETAILED DESCRIPTION OF EMBODIMENTS OF THE INVENTION

Embodiments of the present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Furthermore, like numbers refer to like elements throughout.

Throughout the description, use of the terms sending or receiving does not imply a direct peer to peer transmission between two entities, nodes or devices. In the present invention, the transmission may be either direct or involve any number of entities participating in the transfer between the final recipient of information and the original sender of the information.

Further, it may be noted that throughout the description when an item, a message, information or data is sent or received, this may also mean that only a digest or a reference to the item, message, information or data is sent or received, not the actual item, message, information or data itself. However, in most cases a direct reference to a specific item, message, information or data is used in the text, in order to simplify the description for a reader.

Figure 1:
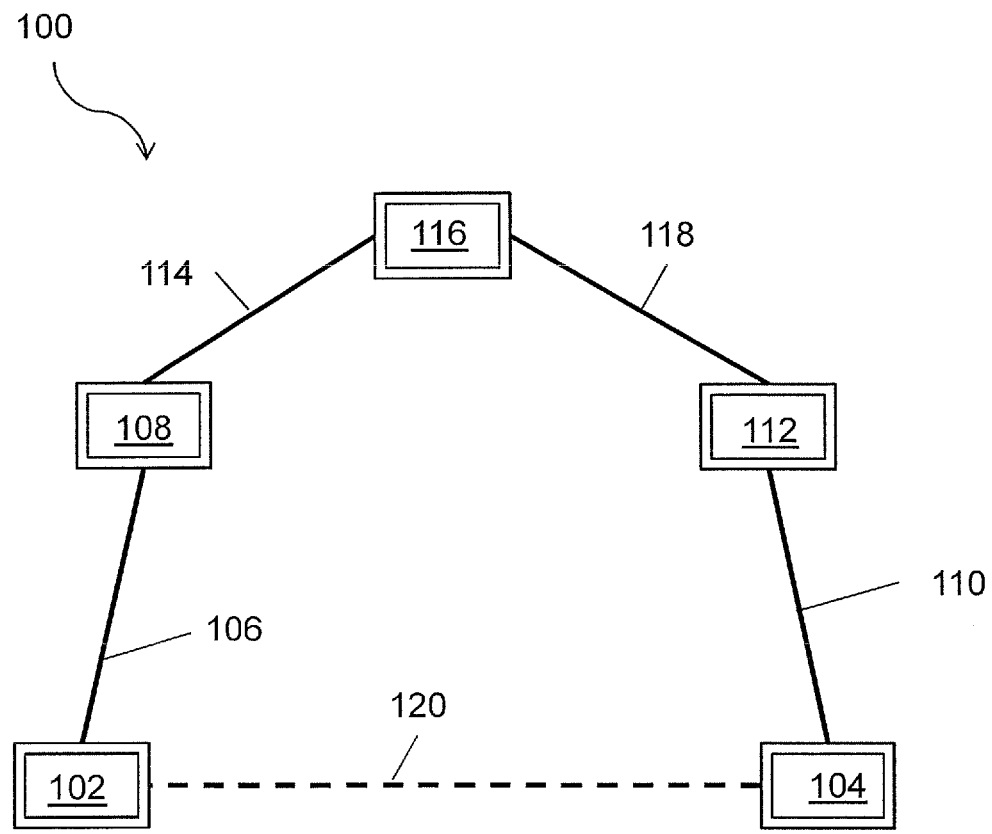
FIG. 1 schematically shows a communication system where a method of performing a transaction may be used.

FIG. 1 shows a schematic diagram of an exemplary communications system 100 in which the disclosed embodiments may be applied. The communications system 100 comprises a number of devices 102, 104, 108, 112, 116 which may or may not be able to communicate with each other. The devices 102, 104, 108, 112, 116 may e.g. take the form of mobile communications devices, such as mobile phones or portable digital assistants (PDA), or stationary (desktop) computers or portable (laptop) computers.

A method in which a first device 102, wishes to establish a connection with a second communication device 104, will be described below.

The first device has an established trusted communication relation 106 with a first witness device, also called first trusted device 108. The second device has an established trusted communication relation 110 with a second trusted or witness device 112. The first trusted device also has an established trusted communication relation 114 with a transaction witness device or fourth trusted device 116 and the second trusted device 112 has an established trusted communication relation 118 with the same fourth trusted device 116. The term "established trusted communication relation" implies that devices having such a relation know and trust each other in a digital sense, for example that they have accepted each other's public signature keys. The establishment of any such a relation might take place according to methods described herein.

In FIG. 1 solid lines 106, 110, 114, 118 between two devices 102, 104, 108, 112, 116 represents that communication has previously been established between the two communication devices at each end of the solid line 106, 110, 114, 118. As indicated by a dashed line 120 communications is to be established between the first device 102 and the second device 104.

The function of the first trusted device or witness device 108 in relation to the first device is to enable the first device 102 to act in a digital transaction. Transactions are further elaborated below. The first witness device 108 vouches for the identity of the first device 102. The first witness device 108 also performs the function of ensuring that transactions performed by the first device 102 confirm to a given policy for the transaction. Policies are discussed further below. In addition, the first trusted device 108 may also reassure the identity of the first device 102 within future transaction boundaries, i.e. in a future execution of a relation established through a transaction. The second trusted device 112 has the corresponding function in relation to the second device 104.

The first, second and fourth trusted device are part of the same witness network, or network of trusted devices, which means that the first trusted device 108 and the second trusted device 112 may also have an established communication relation. Since this relation is irrelevant for the method for establishing a communication relation as described below, this is not indicated in FIG. 1. Devices within one and the same witness network know and trust each other in a digital sense, which for example means that they are aware of each other's digital signatures. A witness network may for instance be hosted by a mobile operator. It may also be noted that it is not necessary for the first, second and fourth trusted device to be different devices, one and the same trusted device may act or serve as or perform the functions of one or more of the other trusted devices or witness devices.

Figure 2:
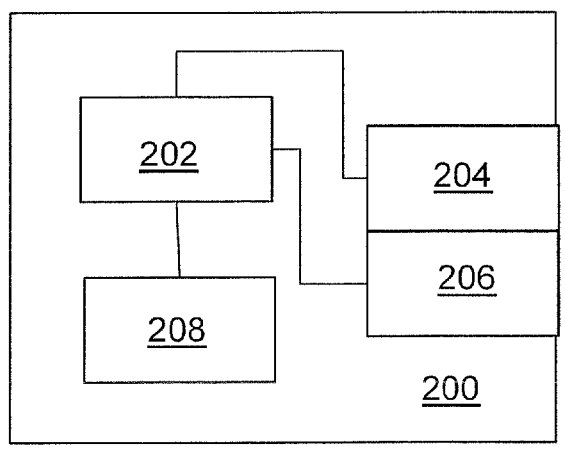
FIG. 2 illustrates a device which may be used in a transaction.

FIG. 2 is a schematic diagram of internal components of a device 200 corresponding to the devices 102, 104, 108, 112, 116 of FIG. 1 according to embodiments. The device 200 comprises an evaluating functional block 202, which may comprise a processing unit. The evaluating functional block 202 is arranged to be operatively connected to a data receiving functional block 204, a data sending functional block 206, a data storage functional block 208.

The data receiving functional block 204 is configured to receive data signals from external units, devices, and apparatuses. The data sending functional block 206 is configured to send data signals to external units, devices, and apparatuses. The data receiving functional block 204 and the data sending functional block 206 may be part of a common transceiver functional block configured to both receive and send data. The memory data storage functional block 208 may be configured to store computer program instructions pertaining to a computer-implemented method for authentication of a device and for performing transaction between devices such as when establishing communication or when exchanging or transferring information between devices. The memory data storage functional block 208 may thus form a computer-readable medium which may have stored thereon software instructions. The software instructions may cause the evaluating functional block 202 to execute a method according to embodiments of the present invention. Methods in which a first device 102, wishes to establish a connection with a second device 104, will be described below. The below described methods may be implemented as one or more computer program products. The computer program product may comprise computer program code stored on a computer-readable storage medium, such as the data storage functional block 208. The computer-readable storage medium may thus be a computer memory, a computer-readable disc or the like. The computer-readable storage medium may be a computer chip. The computer chip may be an ASIC or an FPGA. The computer-readable storage medium may load executable program portions to the communication devices 102, 104, 108, 112, 116. When executed on a processor, such as by the evaluating functional block 202, of the communication devices 102, 104, 108, 112, 116, the computer program product thus carries out the disclosed methods.

Communication or exchange of information between devices taking place according to embodiments of the present invention are called transactions. Transactions may be used for an infinite number of purposes, and the examples described herein shall be understood as being just examples, and should not in any way be understood as limiting the use of transactions. Transactions are hosted by a transaction witness, in FIG. 1 this is the fourth trusted device 116.

A transaction does not have to be started on the initiative of a participating device. A transaction witness may for example start a transaction by sending invitations to devices, or a witness device not participating in the transaction may initiate a transaction between two or more other devices. A transaction may be initiated when a need arises at a device of interaction between two or more devices, or a transaction may be initiated according to a predefined time schedule or triggered by an event. As an example, the first and second device, as well as the transaction witness, may run on a common time schedule so that both the first and the second device at a certain time provides certain input data, via the first and second trusted device, to the transaction witness without any invitations being sent. The transaction witness may then, as an example, perform or not perform an action based on the content received in the input data. Another example is when a device sends its input data with a request for a transaction to be created to a witness device without previous knowledge of any transaction ID or host for the transaction. The witness receiving the input data will then create the transaction on reception of the input data and send out invitations to other parties needed for the transaction to take place. The choice of policy may be done by the device sending the input data or by the witness device creating the transaction.

Each transaction is governed by a policy suited to the purpose of the specific transaction. The policy may be described as a set of rules for the transaction. In a witness network, a number of policies are predefined and maintained by the witness network for use in transactions in that witness network. Policies may also be shared between several witness networks. A device may for example obtain information on a suitable policy for the transaction it needs to perform by its corresponding trusted device or witness providing a reference to a suitable policy.

A policy contains role definitions for devices participating in transactions. The role definition defines the originality of a role. As an example, for the role "tax payer", the witness ensures (or confirms) that the device acting in the "tax payer" role represents a validated tax payer in order to participate in the transaction. The policy containing the role definitions specifies the form and content of any input data required by devices acting in the defined role as well as optional reference data to be provided regarding the devices acting in the role.

If reference data is specified in a policy, this is provided by a witness or trusted device with which a certain device acting in a role has an established communication relation. In FIG. 1 the first trusted device 108 may provide reference data about the first device 102 and the second trusted device 112 may provide reference data about the second device 104.

The reference data is provided as confirmation that a witness device has validated the originality of input data received from a device, i.e. that the witness or trusted device has checked that the input data was received from the correct device. This may be done by comparing a digital signature of the input data with a digital signature received from that device when the relation was established between the device and the trusted device.

Optionally, the policy may not state any requirement for the reference data. However, the respective witness device will still validate the originality of the input data received. That the witness device is willing to pass on the input data or in other manner continue the transaction is then seen as an implicit confirmation that the originality of the input data has been validated by the witness device.

The reference data may be of several different types. An example of reference data is a digital signature of the witness device. The signature is added to the input data when the witness device has validated the originality of the input data and confirms that this validation has taken place. Another example of a reference is a personal ID card, a passport number or a social security number.

The policy also contains definitions of data referral methods to be used by the participating devices to process the input data and reference data. The policy will list at least one data referral method. However, it may be noted that the data referral method listed may be "use data in original form to reference data", i.e. it is not necessarily so that any processing needs to take place to reference the data using the data referral method.

Examples of data referring methods are hash or digest methods, which when used by a device to process a data item creates a more or less unique representation of that data item. The uniqueness of a digest or hash value depends on the complexity of the hash method. Hash methods are known per se and will not be further elaborated herein. Other examples of data referral methods are methods that produce a known MIME-type definition or the length of the input data. Any existing and future algorithm or method used for the general purpose of providing a way of representing data may be called a data referral method.

Assuming that the first device 102 now wishes interact with the second device, in this example with the purpose of establishing a communication with, or, in other words, authenticating, the second device 104, as indicated by the dashed line 120 in FIG. 1, the first device 102 starts by sending a request to the transaction witness device, or fourth trusted device 116, via the first trusted device 108, to create a transaction. In the request the first device 102 refers to the policy to be used for the transaction. In this example the policy would pertain to establishing communication between two devices not previously having an established communication, i.e. to authenticate a second device to a first device and vice versa. The input data required from the first device 102 is information pertaining to securely communicating with the first device and the input data required from the second device is information pertaining to securely communicating with the second device. Example of such information would be a signature public key of the respective device.

The reference information regarding the first device is a signature public key of the first trusted device and the reference information regarding the second device is a signature public key of the second trusted device. In case the first device wishes to establish a secure communication with encryption possibilities with the second device, the input data required from the first device could also contain an encryption public key of the first device and the input data required from the second device an encryption public key of the second device.

On receipt of the request the transaction witness device 116 creates a transaction ID unique to device 116.

The transaction ID is used to identify the transaction instance locally at device or node 116. The transaction witness device 116 hosts the instance and data arriving in the transaction from the device 108 and the device 112 until the transaction is completed.

The first device 102 receives the transaction ID via the first trusted device 108. The first device 102 then creates invitations for those devices that are to be part of the transaction, in this case it would be the first device 102 itself and the second device 104, and sends the invitation to the invited devices. If the invitation is sent directly from the first device 102 to the second device 104 it may be sent as clear text. The invitation may also be sent via the first trusted device 108 and the second trusted device 112 to enable secure (if such communication exists between the involved devices) transportation of the invitation.

Each invitation comprises a reference to the policy, the transaction ID and its host and an indication to the invited device regarding the role definition in the policy that it should use or act in if it decides to participate in the transaction.

When the invitation messages have been received at the first and second devices, they each provide the input data as specified in their role in the policy. If the second device does not have information on the policy in itself, it may contact the second trusted device, which, as being part of the same witness network as the first trusted device, will have information on all policies maintained in that witness network. In the exemplified case of establishing a new trusted communication relation the input data required in the role definition in the policy used by the first device is a signature public key of the first device, and the input data required in the role definition in the policy used by the second device is a signature public key of the second device.

The first and second device also process or digest the input data required by them according to one or more data referral methods, if any such methods are specified in the policy.

The invited devices sign their input data (now in possibly digested form) by respective signature public keys which were used when they established their trusted communication relations with their witness (trusted device) and send their input data to their witness, also including information on the transaction ID and policy. To summarize, the data that is signed and sent by the invited devices to their respective witness devices is:
- a reference to the policy used for the transaction
- a reference to the role in the policy that the invited devices acts in for the transaction
- the required input data, in the form required by the policy, i.e. processed according to the data referral method(s) or digest method(s)
- the requirements from each invited and participating device on other devices' input data and reference data
- information on the transaction witness device or node hosting the transaction as well as the relevant transaction ID.
- archiving information for the sending device, if such archiving information has been requested in the policy When the first trusted device receives the input data from the first device it will validate the originality of the input data, i.e. the first device will check that the input data was really received from the first device acting in the role defined by the policy, for example by checking that the signature used to sign the input data is the same as the signature obtained from the first device during the establishment of the trusted communication relation between the first trusted device and the first device and that the first device has been authenticated in the role it is acting in. A corresponding procedure for validating the originality of the second input data will take place in the second trusted device.

When the witnesses, i.e. first and second trusted device, have confirmed the originality of the device sending the input data that they received, they will add any reference information that they are required to provide according to the definitions in the used policy. As noted above, in the exemplified case this is a signature public key of the witness. The witnesses will process their respective reference data according to the same referral methods specified in the policy. Then the witnesses will sign their respective input data, timestamp the added reference information and the role of the participating device by a signature public key used when they were establishing their respective trusted communication relation with the fourth device and send their respective input data to the transaction witness in the form of the fourth trusted device 116 including a specification of the transaction ID at the fourth trusted device. The fourth trusted device (the transaction witness device or node) will then use the transaction ID to find the correct instance of the transaction.

The fourth trusted device then compiles the received input data from the first and second trusted device into a receipt message and the first device receives this message via the first trusted device and the second device via the second trusted device. In the exemplified case where the input data included the signature keys of the first and the second device as well as the reference information in the form of signature keys of the witnesses, the first and second devices now hold each other's signature public keys and the signature keys of each other's witnesses. This means that a trusted communication relation has been established between the first and second device, which is "witnessed" by first and second trusted device by their signature keys being included.

Going more into detail regarding the transfer of the receipt message from the fourth trusted device to the first and second device, this process may also comprise the following steps further enhancing the traceability and reducing the risk of tampering:

When receiving the receipt message the first trusted device may send the first receipt message to a first trusted device archive associated with the first trusted device. Additionally or alternatively the first trusted device may send the first receipt message to a first device archive associated with the first device. Alternatively the first trusted device may forward the first receipt message to the first device to archive. By archiving the receipt message it is ensured that any future disputes regarding the validity and timing of a transaction may be resolved. The archive/s used (the first trusted device archive and/or the first device archive) may upon receipt of the first receipt message send an archiving complete message to the first trusted device, thus confirming that the archiving has been performed. The device/s receiving an archiving complete message may in turn validate that the archiving complete message was sent by the correct archive.

The completion of the archiving of the receipt message may be confirmed to the fourth trusted device by the first trusted device sending to the fourth trusted device a first confirmation message indicating that the first receipt message was received by the first trusted device. A corresponding archiving process may take place in relation to the second trusted device.

When the fourth trusted device has received confirmation that the archiving is completed it may issue a confirmation complete message to the first and second trusted device. The first and second trusted device may use this message as an indication that the transaction has been successfully completed and send the receipt message on to the first and second device only when this confirmation complete message has been received.

Figure 3:
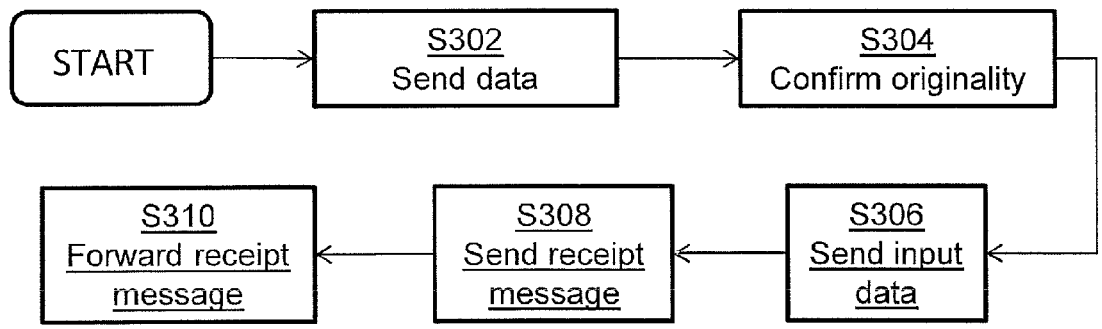
FIG. 3 illustrates a method of performing a transaction.

In its most general form a transaction may be described as follows with reference to FIG. 3:

A prerequisite for a transaction is that the first device has an established trusted communication relation with a first trusted device and the second device has an established trusted communication relation with a second trusted device. Further, the first and the second trusted device each have an established trusted communication relation with a fourth trusted device.

In first step, S302, the first device sends first input data to the first trusted device and the second device sends second input data to the second trusted device.

In a second step S304, upon receipt of the first input data from the first device the first trusted device confirms the originality of the first device and then, in a third step, S306, sends the first input data to the fourth trusted device. Correspondingly, upon receipt of the second input data from the second device, the second trusted device in step S304 confirms the originality of the second device and in step S306 sends the second input data to the fourth trusted device. In step S308 the fourth trusted device sends a first receipt message to the first trusted device and a second receipt message to the second trusted device. Both of these receipt messages comprises the first and the second input data. In step S310 the first trusted device then forwards the first receipt message to the first device and the second trusted device forwards the second receipt message to the second device.

It may be noted that both the first and the second trusted device may confirm to the fourth trusted device that they have received the transaction receipts, and on receipt of these confirmations, the fourth trusted device may issue a transaction result confirmation to the first and the second trusted device indicating that the transaction is now complete.

Figure 4:
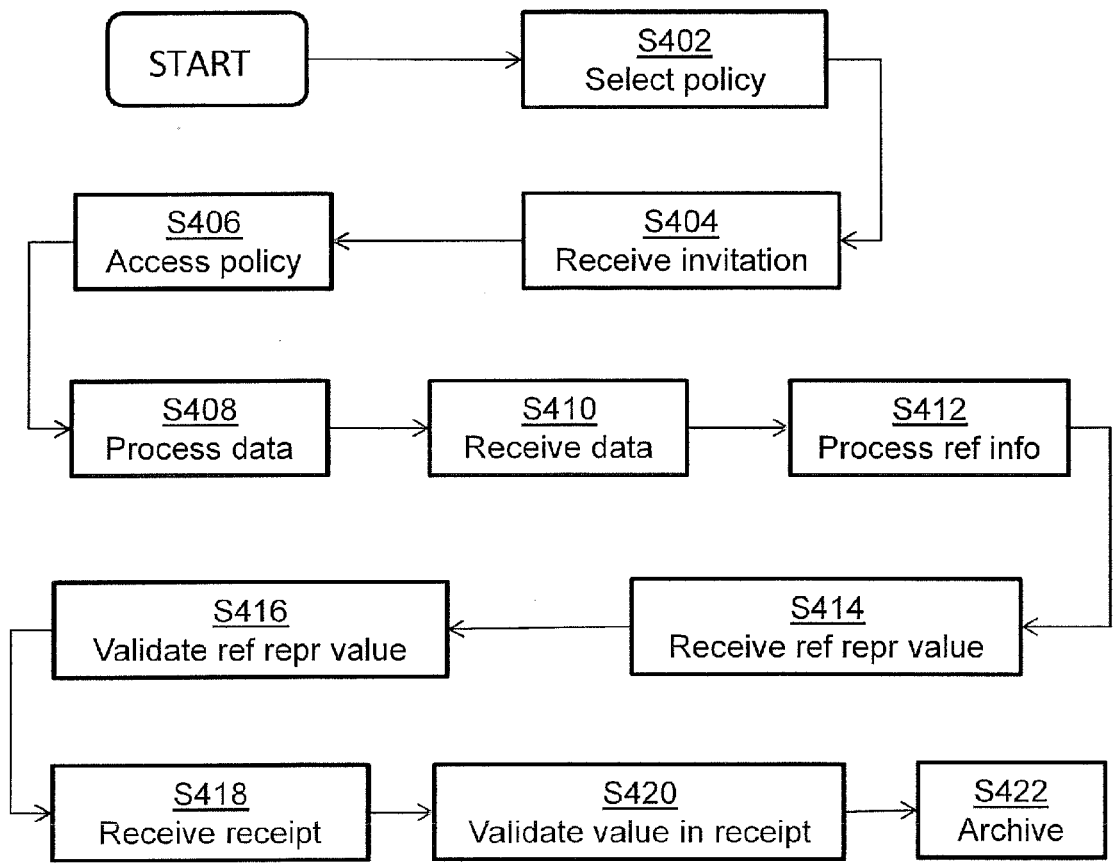
FIG. 4 illustrates in more detail a method of performing a transaction.

A method of performing a transaction between a first device and a second device may also be described with reference to FIG. 4, with the prerequisites that the first device has an established trusted communication relation with a first trusted device and the second device has an established trusted communication relation with a second trusted device, and that the first and the second trusted device each have an established trusted communication relation with a fourth trusted device.

a) In step S402 the first device selects, from a set of policies known to the devices, a policy for the transaction, wherein the selected policy comprises
   a first role definition comprising
      form and content of first input data, if any, to be provided by the first device, and
      form and content of first reference data, if any, pertaining to the first device and which is to be provided by the first trusted device,
   a second role definition comprising
      form and content of second input data, if any, to be provided by the second device to the first device, and
      form and content of second reference data, if any, pertaining to the second device and which is to be provided by the second trusted device,
   a referral method definition pertaining to at least one referral method to be used by the devices for processing respective input data and reference data, b) In step S404 the second device receives an invitation message from the first device, the invitation message comprising information indicating the selected policy and the role to act in it. The first device also creates such an invitation message for itself as both the first and the second device will take part in the transaction in this example.

c) In step S406 the second device accesses the selected policy to obtain the role definitions and the referral method definition, and the first device accesses the selected policy to obtain the roles definition and the referral method definition.

d) In step S408 the second device processes the second input data according to the referral method to form a second representative value, and the first device processes the first input data according to the referral method to form a first representative value. The second device also signs the package comprising the second representative value in the trusted relation with the second trusted device and the first device signs the package comprising the first representative value in the trusted relation with the first trusted device.

e) In step S410 the first trusted device receives, from the first device, the first representative value, and the second trusted device receives, from the second device, the second representative value, f) In step S412 the first trusted device processing the first reference information according to the referral method, and includes the first representative value to form a first referenced representative value, and in the same step S412 the second trusted device processes the second reference information according to the referral method, and includes the second representative value to form a second referenced representative value g) In step S414 the fourth trusted device receives the first referenced representative value from the first trusted device, and the second referenced representative value from the second trusted device, h) In step S416 the fourth trusted device validates the first and second referenced representative value against the policy, i) In step S418 the first trusted device receives, from the fourth trusted device, a transaction receipt comprising the first and second referenced representative value, and the second trusted device receives, from the fourth trusted device, a transaction receipt comprising the first and second referenced representative value.

j) In step S420 the first trusted device validates the second referenced representative value in the received transaction receipt against the second role definition and the second trusted device validates the first referenced representative value in the received transaction receipt against the first role definition.

k) In step S422 the first trusted device may send the transaction receipt to one or more archives, which may be either an archive associated with the first trusted device or an archive associated with the first device. Alternatively, the first trusted device may forward the first receipt message to the first device to archive. Correspondingly, the second trusted device may send the transaction receipt to one or more other archives, which may be either an archive associated with the second trusted device or an archive associated with the second device, or the second trusted device forwards the receipts to the second device for archiving.

To further understand the usefulness of embodiments of the present invention, some available solutions for secure communication will now be described and compared to the solutions described herein.

To start with, it may be noted that today's internet security model is heavily based on PKI (Public Key Infrastructure) where CA (Certificate Authorities) use their key to sign digital certificates to other entities (businesses and people) to vouch for their real-life identity in a digital world. Companies such as VeriSign and Thawte are issuing certificates to online businesses and many countries have adopted their own CA structure for issuing certificates to its citizens. Unfortunately PKI solutions suffer from numerous design flaws which render PKI solutions less useful for the future of the Internet.

The first problem with the Certificate Authority is that there is a one single cryptological key used to sign issued certificates with. What this really means is that all users of a CA structure are considering the single key of the CA as the truth. The more users a CA has the more value is built up around this single CA key. As a consequence the single key of the CA must be protected due to the complete collapse of the CA structure if that single key was exposed and used with the wrong intentions. It may be noted that the single key of the CA has an abnormally high value in the digital world but no real counterpart in the traditional world.

The second problem of the CA is that they do not map well to the underlying social structure. CAs are normally companies performing some validation process for a company or person to get its certificate. CAs operate in an open market and charges for issued certificates. Recent history has shown that the validation process, performed by CAs, have been weakened over time to be able to cut costs and gain competitive advantages. Recently CAs have agreed upon issuing new certificates with stronger validation processes but the pattern may be viewed as just showing some kind of inflation in the trust of certificates. One interesting aspect is the question of whether https (Hypertext Transfer Protocol Secure) traffic is secure. In a technical sense it may be but it might not be so identity wise. To illustrate this it may be noted that in a web browser one may list all trusted CAs' certificates pre-installed for ones system. Whenever one of these CAs vouches for someone else's identity the browser will inform you of a secure connection. Normally there are hundreds of CAs listed in a browser, but there may only be a few of those companies one has even heard of and therefore a relevant question to ask may be how many of them one trusts.

Using the solution described herein it is possible to turn around the security perspective as there are no central authorities with a single key of trust. This also means that according to these solutions there is no "one-size fits all" cryptology solution, for everyone to use, enforced by a single entity, but instead the presented solution is built up around concepts of loosely coupled autonomic networks that make up their own rules for acceptance of external identities. In turn this means that using the present solution a possibility is given for every organization, governmental function or private person to start their own network. A network may use external networks to leverage the real identity behind a digital identity by requesting references for the identity to accept from the external network.

Once being accepted the identity (i.e. a device participating in transaction) may choose a different cryptology solution to use for the connection with the new network, reflecting the risk in the connection, at the same time as the identity may control the life cycle of the connection with the new network through the external networks control mechanism given to the identity.

This means that instead of identities being created by a single CA digital identities are now accepted and leveraged by multiple networks that map to real life relations. Identities scale over time; from being born to become a citizen, and later a student at some university and further ahead employee at different companies. The real-life behind the digital identity move in and out from different networks, reflecting the identity's real life movements, using their own security token(s) reflecting the real life identity's perceived risk in each relation.

An identity accepts a network in the same way a network accepts an identity. In the presented solutions such acceptance is based on mutual references by one or more common external networks of trusted devices. At least one common network must exist but if reference information does not suffice—physical validation may be used in addition. Acceptance of an identity to a network technically defines the exchange of security to be used when communicating between the network and the identity. The external network(s) used in the acceptance define the mechanism for either the network or the identity to terminate the relation. In technical words termination of a relation is done by canceling the execution of the external networks additional signature of the identity/network. This may be compared to the action taken in a PKI structure where the PKI no longer acknowledges a specific certificate.

To compare existing solutions the following life cycle for digital relations is defined: Creation, Usage and Termination. The creation phase defines the process of exchanging keys between two identities and binding them to some real-life identity. The usage phase defines the process of using the keys, defined in the creation phase, to interact digitally and the termination phase defines the process of disabling relation for further interactions.

In the creation phase in a PKI structure a certificate is issued and signed by the CA. A validation process is carried out by the CA of the real life entity to ensure that the entity is who he claims he is. When validation process has been completed the CA signs the certificate and gives the certificate to the requesting entity.

Thus, in PKI a root certificate is defined by the CA. The root certificate is signed by the CA's own private key and distributed to all users of the CA system. The CA issues new certificates to its users and signs it with the private key of the root certificate. The same private key, of the CA, is used for all issued certificates. A user then trusts another user certificate based on that it can validate the user certificate against the already accepted root certificate of the CA.

Here it may be noted that the CA is using the same key to sign all certificates which in turn means that the complete infrastructure relies on a single key being securely stored and protected against misuse. As a consequence, if the CA's private key is lost all issued certificates immediately lose their value due to the inability to distinguish a falsely issued certificate from an authentic one. The CA plays a passive role in an interaction between users of issued certificates.

In a PKI structure a certificate can only be revoked in two ways:

1) if a certificate contains an expiration date meaning that it should not be considered valid and hence should not be accepted by the users after that date has passed 2) if a user makes a validation request to the CA to check if a specific certificate is still valid, and it turns out that it is not valid. It may be noted that to protect itself from high traffic a CA often charges for such validation request.

As an extension to the PKI structure using a single CA a concept called "web of trust" may be used. In this concept multiple CA structures may be used which means that multiple trusted parties may be used by one single identity. In a web of trust the nodes use each other to vouch for an owner identity of a specific key and multiple owners may vouch for a single key's owner's identity. This means that when trusted nodes have signed the key of an untrusted party a node accepts the signed key to belong to the untrusted party. This in turn gives a stronger binding of an identity's key than in a CA system due to the use of multiple trusted nodes.

However, the trusted node is using the same key to sign all external keys which means that if a trusted node's private key is lost all signed keys immediately lose their value due to the inability to distinguish a falsely issued certificate from an authentic one. In other words the trusted nodes play passive role in the interaction between two devices. Further, just as in a single CA structure there are limited possibilities to revoke a key, meaning that the termination of a relation is not supported. According to the solutions presented herein, the creation of a relation between two identities, or devices, uses a common trusted network between the devices. In this way a new key may be used for each relation of an identity. A new key is selected by the trusted network for each relation. This enables each relation to be administered separately without conflicting with other relations. Different keys in different relations also enables key selection based on the perceived risk in the relation. To establish a relation a transaction is created for the key exchange. The transaction, logically, involves five nodes that may be reduced to three. Each identity or device provides their key to the node, or trusted device or witness device in the trusted network. Each trusted device then add their key for the relation and finally the trusted network responds with a receipt message including compound keys for each identity or device in the relation.

According to the solutions described herein an identity is accepted by a common third party network. The acceptance of an identity is performed by the identity creating its new key for the relation and the trusted network creating a new key for each identity or device in the relation. A valid signature for one identity in the relation is based on both the identity's key and the trusted network's key for the relation.

When using embodiments of the present invention to perform transactions for setting up communication relations between devices different keys may be used by an identity in different relations. The signature for an identity is made up of the trusted device's signature (for the specific relation) and the identity's signature (for that relation). There is no centrally known key for the infrastructure, and, thus, no key used in all relations.

Further, an identity may change its key for a relation by instructing the trusted network node (or first witness device) which in turn vouches the change to the remote node (the second device).

In this way an active third party involvement is achieved in the interaction between two identities or devices which in turn gives a third party notion of time of an interaction, a third party notion of (hash of) content in an interaction, and a third party instant confirmation of a valid relation (the reference informations are still the same as when the relation was setup).

In the solution described herein there is, at least, one trusted network for each relation. The complete signature of an identity is always defined as the signature of the identity itself together with the signature for a specific relation in the trusted network. This in turn means that the trusted witness network may choose not to execute the signature of the network for the relation and thereby making the complete signature incomplete and in that way terminate the relation. Thus, a single relation may be terminated without affecting other relations of the identity.

It may also be noted that multiple networks may be used to multiply the security for termination in the case where one of the networks refuse to terminate the relation. In other words all trusted networks' signatures must be present to render an identity's signature valid.

In some embodiments of the invention digital delegation instructions may be used for delegating possibilities of interaction to other nodes, devices, identities or entities. This concept is not supported by a CA or Web of Trust structure.

To further explain this concept, assume that the second device wants to delegate a right to the first device to exchange information or in other manner interact with a third device on behalf of the second device. The digital delegation instruction contains the compound keys of the third device and compound key of the first device and/or reference data of the first device to prove itself in a new relation with the third device, and is registered at the trusted node of the second device, i.e. the second trusted device or second witness device. Whenever the digital delegation instruction is being used its validity is confirmed by the second trusted device and the second device may at any time cancel the digital delegation instruction by informing its witness (the second trusted device) not to sign it as valid for future requests.

As described above, the transaction taking place according to embodiments of the present invention are governed by policies. Going more into detail, a policy defines a set of constructs for creating rules to control the boundaries of a transaction. To create a policy at least two parts are used, the first being a role document which is a document describing the legal meaning of a role. This could for instance be "nurse" or "CEO", when a device that takes part in a transaction represents that role. The second part is a content type document, which is a document describing the format type of data, which for example is MP3, "drivers licenses", "invoice", all depending on the type of transaction. Further, as mentioned above, to create a policy a set of digest method algorithms or data referral methods are defined. The digest methods defined in policy will be used throughout the transaction for all content exchanged.

To summarize, the policy comprises:

The required roles of the identities to act in the transaction. The policy also defines the maximum and minimum boundaries of number of identities in each role.

The data that each role has to contribute within the transaction. The data may be restricted by a set of values such as "Yes" or "No" or unrestricted to accept any value for the data.

The reference data that a trusted node or device (witness), in the trusted network, will add for an identity in a role. The reference data may be restricted by a set of values such as "Yes" or "No" or unrestricted to accept any value of the reference data.

The network where the policy is to be executed.

The archiving permission for each role, i.e. which devices are allowed to archive the transaction receipt message.

The permission for an act to be delegated or not for each role.

It may be noted that to create a transaction according to embodiments of the present invention a policy and a transaction configuration defining the number of identities to interact for each role in the transaction are used. As described above, when a transaction has been created identities (in the form of the first and second device) are invited to sign in the transaction. Each trusted node or device (witness), in the trusted network, will validate that the identity is validated as the legal role in which the identity is trying to sign in the policy. The trusted device further adds the reference data for the specific identity and waits for other identities to complete the transaction. When all devices have completed the transaction, a transaction receipt is distributed to each trusted device and, if the policy that was used allows, to the archive(s) of choice of the identity.

When a device participates in a transaction according to a selected policy reference conditions on another device in a transaction may be defined. By using reference conditions a transaction is rendered void if the other device in the transaction does not live up to the reference requirement defined by a participating device. One example is that a device may use a condition that it will only participate in a transaction if and only if reference information regarding the other device is provided which ensures that the other device represents a certain entity. In simple terms: "I am signing in transaction if, and only if, the counterpart turns out to be PersonX". This information is provided along with the input data.

The concept of policies adds security and controllability of transactions in a way that was not possible using the previous solutions of a PKI structure.

It is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a device" or "the device" may include several devices, and the like. Furthermore, the word "comprising" does not exclude other elements or steps.

The invention claimed is:

1. A method of performing a transaction between a first device and a second device,
    the first device having an established trusted communication relation with a first trusted device and the second device having an established trusted communication relation with a second trusted device,
    the first trusted device and the second trusted device each having an established trusted communication relation with a fourth trusted device, wherein the fourth trusted device having no direct communication relation established with the first device or the second device,
    the first device and the second device being aware of a policy for the transaction specifying a role definition for the first and the second devices,
    wherein the first device has no direct communication relation established with the second device, and
    wherein the first device performs a transaction with the second device, comprising the steps of:
    the first device sending, to the first trusted device, first input data, and the second device sending, to the second trusted device, second input data,
    the first trusted device confirming the originality of the first device, validating that the first device is acting in the role defined by the policy, and sending the first input data to the fourth trusted device, and the second trusted device confirming the originality of the second device, validating that the second device is acting in the role defined by the policy and sending the second input data to the fourth trusted device,
    the fourth trusted device, upon receipt of the first input data and the second input data, sending to the first trusted device a first receipt message comprising the first input data and the second input data, and sending to the second trusted device a second receipt message comprising the first input data and the second input data,
    the first trusted device sending, to the first device, the first receipt message and the second trusted device sending, to the second device, the second receipt message, wherein the second device has an established trusted communication relation with a third device, and the third device has an established trusted communication relation with a third trusted device, further comprising the steps of
    the second device creating a digital delegation instruction allowing the third device to act on the second device's behalf in a transaction, the digital delegation instruction specifying a signature key of the third device and a signature key of the third trusted device, the second device sending the digital delegation instruction to the second trusted device for registration, and the second device sending the digital delegation instruction to the third device.

2. The method according to claim 1, wherein
    the step of confirming the originality of the first device further comprises the first trusted device adding, to the first input data, first reference information, and
    the step of confirming the originality of the second device further comprises the second trusted device adding, to the second input data, second reference information, and
    wherein the first and second receipt messages further comprise the first and second reference information.

3. The method according to claim 1, further comprising the step of the first device receiving a first invitation message comprising information pertaining to first input data that the first device is requested to provide, and the second device receiving a second invitation message comprising information pertaining to second input data that the second device is requested to provide.

4. The method according to claim 1 wherein the first input data comprises information according to the policy of the transaction, and the second input data comprises information according to the policy of the transaction.

5. The method according to claim 4, wherein the first input data comprises information pertaining to securely communicating with the first device in future communications between the first device and the second device, and the second input data comprises information pertaining to securely communicating with the second device in future communications between the first device and the second device.

6. The method according to claim 4 wherein the first input data comprises a signature key of the first device, and the second input data comprises a signature key of the second device which the first and second devices will use for future communications between the first device and the second device.

7. The method according to claim 5, wherein the first reference information comprises a signature key of the first trusted device and the second reference information comprises a signature key of the second trusted device.

8. The method according to claim 4, wherein the first input data comprises an encryption key of the first device, and/or the second input data comprises an encryption key of the second device.

9. The method of claim 1, wherein the step of creating the digital delegation instruction comprises including the signature key of the first device and the signature key of the first trusted device in the digital delegation instruction.

10. The method of claim 1, further comprising the steps of
    the third device executing the signature key of the third device on the digital delegation instruction and content data to be transferred from the third device to the first device to form a third device signed message,
    the third device sending the third device signed message to the third trusted device, the third trusted device validating the signature of the third device in the third device signed message,
    the third trusted device executing the signature key of the third trusted device on the third device signed message to form a third trusted and third device signed message,
    the third device receiving the third trusted and third device signed message,
    the first device receiving the third trusted and third device signed message from the third device,
    the first device extracting the digital delegation instruction from the third trusted and third device signed message and sending the digital delegation instruction to the second trusted device,
    the second trusted device validating the registration of the digital delegation instruction at the second trusted device and executing the signature key of the second trusted device on the digital delegation instruction to form a second trusted device signed digital delegation instruction,
    the first device receiving second trusted device signed digital delegation instruction from the second trusted device, the first device validating the second trusted device signature of the second trusted device signed digital delegation instruction, the first device validating, on basis of the digital delegation instruction, the third device signature of the third trusted and third device signed message and/or third trusted device signature of the third trusted and third device signed message.

11. The method according to claim 7, wherein the information pertaining to first input data that the first device is requested to provide, and the information pertaining to second input data that the second device is requested to provide comprise a reference to a policy which specifies the form and content of the first and second input data, the form and content of the first and second reference information and a specification of which of the devices in the transaction may receive a receipt message.

12. The method according to claim 1, further comprising the step of the first trusted device sending, to the fourth trusted device, a first confirmation message indicating that the first receipt message was received by the first trusted device, and the second trusted device sending, to the fourth trusted device, a second confirmation message indicating that the second receipt message was received by the second trusted device.

13. The method according to claim 12, further comprising the step of the fourth trusted device sending to the first and the second trusted device, upon receipt of the first and the second confirmation message, a confirmation complete message indicating that the first and the second confirmation message has been received by the fourth trusted device.

14. The method according to claim 13, further comprising the step of the first trusted device sending the confirmation complete message to at least one of: a first trusted device archive associated with the first trusted device, a first device archive associated with the first device, or the first device and/or the second trusted device sending the confirmation complete message to at least one of: a second trusted device archive associated with the second trusted device, a second device archive associated with the second device, or the second device.

15. The method according to claim 1, further comprising the step of the first trusted device sending the first receipt message to at least one of: a first trusted device archive associated with the first trusted device, a first device archive associated with the first device, or the first device, and/or the second trusted device sending the second receipt message to at least one of: a second trusted device archive associated with the second trusted device, a second device archive associated with the second device or the second device.

16. The method according to claim 15, further comprising the step of the first trusted device archive, upon receipt of the first receipt message, sending an archiving complete message to the first trusted device, and/or the first device archive, upon receipt of the first receipt message, sending an archiving complete message to the first trusted device and/or the second trusted device archive, upon receipt of the second receipt message, sending an archiving complete message to the second trusted device, and/or the second device archive, upon receipt of the second receipt message, sending an archiving complete message to the second trusted device.

17. The method according to claim 1, wherein the first trusted device serves also as the fourth trusted device and/or wherein the second trusted device serves also as fourth trusted device, and/or wherein the first trusted device serves also as the second trusted device.

18. A method in a first trusted device of performing a transaction between first device and a second device, the first device having an established trusted communication relation with the first trusted device and the second device having an established trusted communication relation with a second trusted device, the first trusted device having an established trusted communication relation with a fourth trusted device, wherein the fourth trusted device have no direct communication relation established with the first device or the second device, comprising the steps of the first trusted device receiving, from the first device, first input data, the first trusted device confirming the originality of the first device, validating that the first device is acting in a role specified by a policy for the transaction, and sending the first input data to the fourth trusted device, the first trusted device receiving, from the fourth trusted device, a first receipt message comprising the first input data and second input data received by the fourth device, the first trusted device sending, to the first device, the first receipt message, wherein the second device has an established trusted communication relation with a third device, and the third device has an established trusted communication relation with a third trusted device, further comprising the steps of the second device creating a digital delegation instruction allowing the third device to act on the second device's behalf in a transaction, the digital delegation instruction specifying a signature key of the third device and a signature key of the third trusted device, the second device sending the digital delegation instruction to the second trusted device for registration, and the second device sending the digital delegation instruction to the third device.

19. The method according to claim 18, wherein the step of confirming the originality of the first device further comprises the first trusted device adding, to the first input data, first reference information, and wherein the first receipt message further comprises the first reference information and second reference information received by the fourth device.

* * * * *